Feb. 4, 1941.   N. W. GLASS   2,230,883
FILTER
Filed Jan. 31, 1938
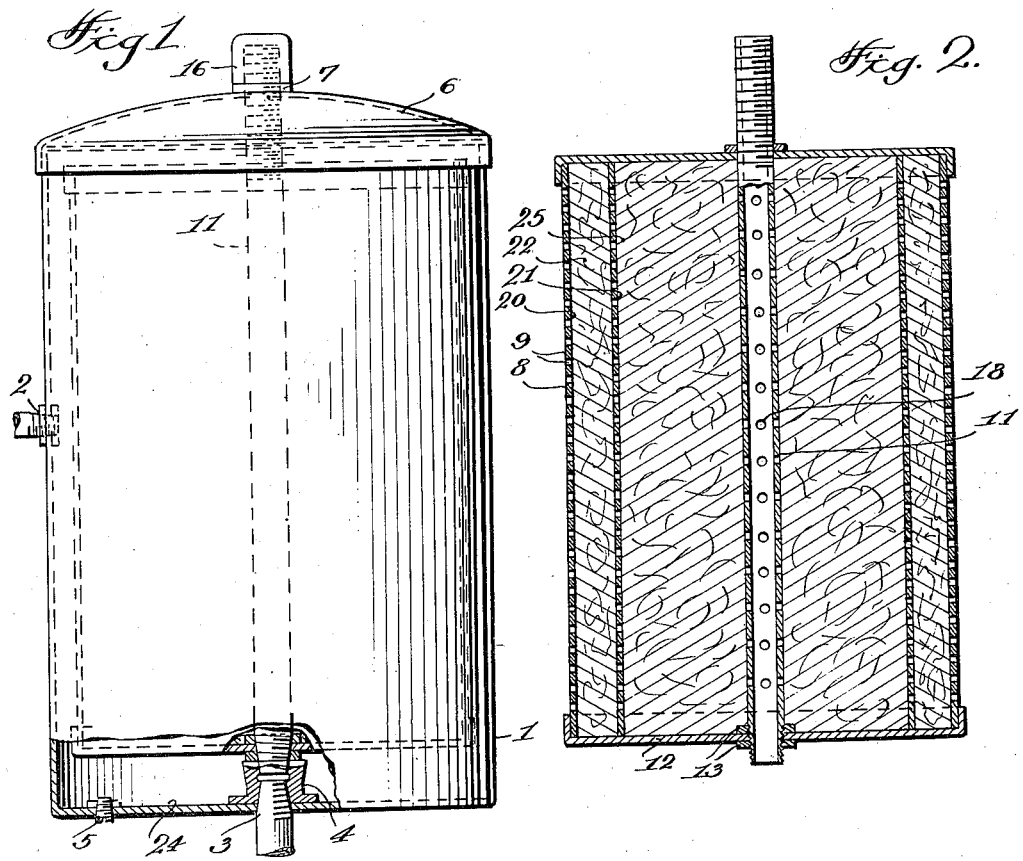
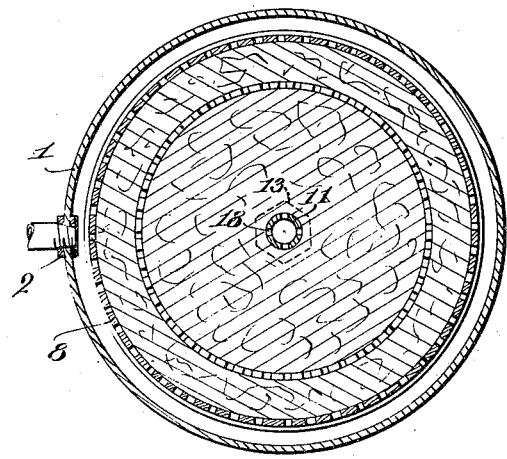
Inventor
Ned W. Glass
By E. M. Hulse
Attorney Patented Feb. 4, 1941

2,230,883

UNITED STATES PATENT OFFICE 2,230,883

FILTER

Ned W. Glass, Fort Wayne, Ind.

Application January 31, 1938, Serial No. 187,862

1 Claim. (Cl. 210—135)

The invention relates to filters adapted for filtering oil and other liquids.

The object of the invention is to provide a simple and efficient filter in which the filtering element and the discharge conduit are combined so that it is removable as a unit from the device for replacement or cleaning.

Another object is to provide a filter in which all the liquid is compelled to travel through the filtering medium in its passage through the device.

The invention is illustrated in the accompanying drawing, in which—

Figure 1 is an elevation of the device partly broken away.

Fig. 2 is a vertical cross-section of the filtering unit and

Fig. 3 is a transverse cross-section of the unit, the filtering medium being omitted.

Referring to the illustrative drawing, 1 is a casing having an admission port 2 in its side wall and an opening 3 in its bottom. An internally threaded fitting 4 is secured to said bottom wall about the opening 3 and receives in its lower portion the discharge pipe of the system into which the device is connected. The admission pipe of the system is connected to the casing at the port 2. A drain opening in the bottom of the container is normally closed by the plug 5. A cover 6 closes the open top of the container, a gasket 7 being disposed between the cover and the upper edge of the container.

The filtering unit comprises a preferably annular container 8 having its side wall 9 perforated throughout the perforations 10 being relatively small. There may be as many as 100 perforations to one square inch of area of said wall. A perforated tube 11 extends centrally through the container 8 and it is secured to the bottom 12 by the lock nuts 13 and to the top closure 14 by the lock nuts 15, which nuts are threaded on the tube. The lower threaded end of the tube that projects below the bottom 12 of the container threads into the upper portion of the outlet fitting that is above the bottom of the casing 1. The threaded upper end of the tube extends through an opening in the cover 6 and a cap nut 16, a gasket 17 being between it and the cover, serves to clamp the cover 6 on the casing and lock the unit in the casing. Any form of openings 18 may be provided in the tube 11.

A perforated annular partition 19, such as a wire screen, is fixed within the container or cartridge 8 at a suitable distance from the side wall 9, and forms two compartments 20, 21 in the container. A relatively coarse filtering agent 22 fills the compartment 20 and a relatively fine filtering agent 25 fills the compartment 21. Any suitable form of filtering medium may be used. The partition 19 may be omitted if desirable, for some uses of the filter.

The liquid entering the device at the inlet port 2 travels both upwardly and downwardly in the outer chamber or space 23 between the casing and the filter unit, maintaining a constant pressure on the wall 9 of the container or cartridge 8 throughout its circumference. The liquid thence passes through the perforated wall of the container into and through the outer coarse filtering medium, then through the partition 19 into and through the inner fine filtering medium and then into the tube through the openings therein, through which tube the filtered liquid flows to the discharge outlet of the device.

The filtering media remove all foreign solid matter from the liquid and any such matter that settles in the outer chamber 23 collects in the space 24 below the filtering unit and may be withdrawn by removing the plug 5. The fitting 4 prevents the sediment in the space 24 from passing into the outlet when the filtering unit is removed.

Since the container or cartridge 8 is connected to the tube 11 the withdrawal of the unit is readily accomplished by removing the cap nut 16 and the cover 6 and then rotating the unit to disconnect the tube from the outlet fitting 4. The unit is then easily lifted out of the casing for cleaning or it may be replaced by a new unit.

What I claim is:

A filtering device comprising a cylindrical outer casing having a side wall provided with an inlet opening and a bottom provided with a centrally disposed outlet opening, an internally threaded hollow socket member fixed on said bottom in axial alinement with the opening therein and projecting upwardly from the bottom, a removable top for said casing having a depending flange fitting on the upper end of the casing, said top having a centrally disposed opening therein, a perforated pipe extending downwardly through the opening in the top and having its lower end screwed into said socket, a disk-like filter head having a central opening receiving the lower end of the pipe, nuts screwed onto said pipe above and below the head and securing the head on the pipe, an upstanding peripheral flange on said head, a second similar filter head on the upper end of the pipe and having a depending peripheral flange, said heads being of equal diameters and the diameters of the heads being less than the internal diameter of the casing, a perforated cylindrical plate fitting between said heads within the flanges thereof, a second cylindrical plate fitted between the heads in concentric relation to the perforated plate and having perforations of less diameter than the perforations of the first plate, a nut screwed on the upper part of the pipe and bearing on the second head to clamp the perforated plates between the heads, filtering material between the perforated plates and between the pipe and second plate to hold the latter in concentric position, and a cap closing the upper end of said pipe and holding said cover closed.

NED W. GLASS.